Aug. 24, 1954 W. E. SAXE 2,687,037
APPARATUS FOR MEASURING PROPORTIONS OF MATERIALS
Filed March 30, 1951 5 Sheets-Sheet 1

INVENTOR.
WALTER E. SAXE
BY HIS ATTORNEYS.
HARRIS, KIECH, FOSTER & HARRIS

Fig. 3.

INVENTOR.
WALTER E. SAXE
BY HIS ATTORNEYS.
HARRIS, KIECH, FOSTER & HARRIS

Aug. 24, 1954       W. E. SAXE       2,687,037
APPARATUS FOR MEASURING PROPORTIONS OF MATERIALS
Filed March 30, 1951       5 Sheets-Sheet 3

Fig. 4.

INVENTOR.
WALTER E. SAXE
BY HIS ATTORNEYS.
HARRIS, KIECH, FOSTER & HARRIS
BY

INVENTOR.
WALTER E. SAXE
BY HIS ATTORNEYS.
HARRIS, KIECH, FOSTER & HARRIS

UNITED STATES PATENT OFFICE 2,687,037

APPARATUS FOR MEASURING PROPORTIONS OF MATERIALS

Walter E. Saxe, Pasadena, Calif., assignor to The Conveyor Company, Inc., Los Angeles, Calif., a corporation of California Application March 30, 1951, Serial No. 218,375

15 Claims. (Cl. 73—32)

The present invention relates in general to an apparatus for determining the proportions of materials and, more particularly, to an apparatus for measuring the proportions of two materials of different densities in a substance containing at least one of the materials. In other words, the present invention relates to an apparatus for measuring the proportions of two materials of different densities in a substance which may consist entirely of one or the other of said two materials, or which may consist of a mixture of the two materials.

In considering the present invention, it is convenient to relate mathematically the volume and weight of the substance, the densities of the two materials which may be present in the substance in various proportions, and the weight of one of the materials in the substance. Thus, assigning the symbol V to the volume of the substance, the symbol W to the weight of the substance, the symbols $D_1$ and $D_2$ to the densities of the respective materials of the substance, and the symbol X to the unknown weight of that one of the materials of the substance whose density is equal to $D_1$, these variables may be related by the equation $$V = \frac{X}{D_1} + \frac{W-X}{D_2} \qquad (1)$$

a primary object of the present invention being to provide an apparatus for automatically solving for X in this equation.

It will be understood that while I have preferred to the densities of the two materials of the substance in the foregoing discussion, the specific gravities of the materials may be employed if desired by introducing a conversion factor, K, into Equation 1 to obtain the equation $$V = \frac{X}{KS_1} + \frac{W-X}{KS_2} \qquad (1a)$$

wherein $S_1$ and $S_2$ are the specific gravities respectively corresponding to the densities $D_1$ and $D_2$. Equation 1a may be converted into an equation involving forces only by multiplying both sides thereof by K to obtain $$KV = \frac{X}{S_1} + \frac{W-X}{S_2} \qquad (1b)$$

Also, in connection with Equation 1b it is convenient to employ the metric system because of the unique relation in such system between units of volume and weight. For example, in the metric system, one cubic centimeter of water and one liter of water respectively weigh one gram and one kilogram. Thus, when considered on this basis, it will be apparent that the density and specific gravity of water are both unity. Similarly, a material having a density of, for example, 2.5 grams per cubic centimeter, or 2.5 kilograms per liter, also has a specific gravity of 2.5. Thus, it will be seen that in the metric system, density and specific gravity are numerically equal so that no conversion factor is necessary to convert from one to the other, or, more accurately, a conversion factor, K, of unity is all that is required. However, it will be understood that the present invention is not to be regarded as limited to the metric system since the same results may be obtained by, for example, establishing a unit of volume which is equal to the volume of water having one unit of weight. More particularly, such a volumetric unit might be the volume of one pound of water, for example. However, the present invention may also be employed in connection with the English system of units in instances where the use of the specific gravities, rather than the actual densities, of the two materials is desired by building the necessary conversion factors into the embodiments of the invention to be considered hereinafter.

While the present invention may be employed to determine the proportions of any two materials of different densities, the invention finds particular utility in the construction industry for measuring the proportions of sand and water in aggregates employed in concrete. Consequently, the invention will be considered in such connection hereinafter with no intention of limiting it thereto.

Also, the invention will be considered in connection with the metric unit system hereinafter for convenience with no intention of limiting the invention thereto.

Since, in the metric system, water has a density and/or specific gravity of unity so that K is equal to unity, Equation 1b becomes $$KV = W - X + \frac{X}{S} \qquad (2)$$

wherein V equals the volume of a sample of sand whose moisture content is to be determined, (V is multiplied by the conversion factor of unity so that the left side of Equation 2 is in units of weight or force), W equals the weight of the sand sample, S equals the specific gravity of the sand, and X equals the unknown weight of the sand, i. e., the weight of the dry sand, a primary object of the invention, as indicated above, being to provide an apparatus which includes means for automatically solving for X.

Important objects of the invention are to provide an apparatus for determining the proportions of sand and water in a sand sample which includes: a receptacle for the sand sample; weight responsive means, such as a weight scale, operatively connected to the receptacle for measuring the weight of the sand sample; volume responsive means operatively associated with the receptacle and responsive to the volume of the sand sample; and means operatively connected to the weight responsive means for solving for X in Equation 2.

Another important object of the invention is to provide such an apparatus wherein the equation solving means includes lever means for applying to the weight responsive means, in addition to the weight, W, applied thereto, a net actuating force sufficient to change the indication of the weight responsive means from W to KV. As will be apparent, such a net actuating force is equal to $$\frac{X}{S} - X \qquad (3)$$

Since the specific gravity, S, of the dry sand may be determined, the value of X may readily be solved for in Expression 3.

Another important object is to provide an apparatus which includes force producing means for applying an input force equal to X to the lever means, and wherein the lever means includes a lever system for converting the input force into a net actuating force equal to Expression 3 applied to the weight responsive means, or into two actuating forces $X/S$ and $-X$ applied thereto. Thus, when the force producing means is operated to apply an input force to the lever means which is sufficient to change the reading of the weight responsive means from W to KV, then such value of the input force is equal to X. Consequently, the apparatus automatically solves for X in Equation 2 when the input force attains a value sufficient to change the reading of the weight responsive means from W to KV, which is an important feature of the invention.

Another object is to provide an apparatus wherein the lever means includes a lever having a movable fulcrum associated with a scale calibrated in terms of the density of the sand. With this construction, the apparatus of the invention may be adjusted to accommodate sands having different dry densities, which is an important feature. Also, with this construction, the apparatus of the invention may be employed to measure the density of dry sand, which is another important feature.

Another object is to provide an apparatus having weight responsive means, such as a weight scale, for measuring the input force applied to the lever means by the force producing means wherein such weight responsive means includes a dial calibrated in terms of the weight of dry sand in the sand sample, the weight of water in the sand sample, and the percentage by weight of water in the sand sample.

Another object is to provide a lever means including a lever having a movable fulcrum associated with a scale for indicating the percentage by weight of the water in the sand sample.

Another object of the invention is to provide an apparatus wherein the volume responsive means may comprise graduations on the receptacle for the sand sample, float means responsive to the lever in the receptacle, and the like.

An important object of the invention is to provide an automatic apparatus of the foregoing general character which determines the amount of water present in the sand sample and which then adds to the sand sample the additional water required to bring the water content up to the value necessary for a particular batch of concrete.

Another object is to provide an apparatus of the character described in the preceding paragraph having de-energizable means for delivering dry or wet sand to the receptacle, and having means controlled by the aforementioned means for measuring input force for de-energizing the de-energizable sand delivering means when the input force attains a predetermined value, corresponding to a predetermined weight of dry sand.

A further object is to provide such an apparatus which includes another weight responsive means operatively connected to the receptable, which includes de-energizable means for delivering water to the receptacle, and which includes means controlled by such other weight responsive means for de-energizing the de-energizable water-delivering means when such other weight responsive means indicates a predetermined value of total weight in the receptacle. Consequently, when the weight responsive means for measuring input force attains its predetermined value, corresponding to a predetermined weight of dry sand, and when the other weight responsive means connected to the receptacle attains a predetermined value, corresponding to a predetermined total weight of sand and water, then the desired proportions of sand and water are attained, which is an important feature.

Another object is to provide an apparatus of the character discussed in the paragraphs immediately preceding which includes means for completely automatically controlling the sand-delivering and water-delivering means so that a batch of predetermined sand and water weights is automatically obtained.

The foregoing objects and advantages of the present invention, together with various other objects and advantages thereof which will become apparent, may be attained with the exemplary embodiments of the invention which are described in detail hereinafter and which are illustrated in the accompanying drawings. It will be understood that each of the embodiments of the apparatus of the invention illustrated in the accompanying drawings is capable of performing the method of the invention. Referring to the drawings.

Figure 1:
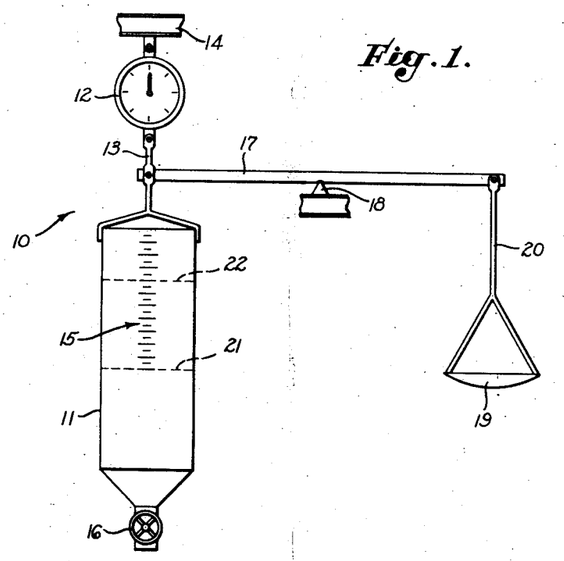
Fig. 1 is a diagrammatic view of an apparatus embodying the invention.

Referring first to Fig. 1 of the drawings, the embodiment illustrated therein is designated generally by the numeral 10 and includes a receptacle 11 for a substance containing at least one of two materials of different densities whose proportions are to be determined, the substance being regarded hereinafter for purposes of illustration as a sand sample containing sand and water in various possible proportions ranging from all sand to all water. The receptacle 11 is operatively connected to a weight responsive means which is exemplified as a weight scale 12, the receptacle being shown as suspended from the scale 12 by a link 13. The scale 12 in turn is suspended from a support 14. A volume measuring means for measuring the volume of a sand sample placed in the receptacle 11 is operatively associated with the receptacle, such volume measuring means comprising graduations 15 on the receptacle 11, which is preferably translucent or transparent, in the particular construction illustrated. The receptacle 11 is provided at its lower end with a valve 16 which may be opened to dump the sand sample after the proportions of water and sand have been measured in a manner to be described.

The embodiment 10 includes lever means comprising a lever 17 pivotally connected at one end to the link 13 and supported at its midpoint by a fulcrum 18 in the particular construction illustrated. A force producing means for applying an input force to the lever means is operatively connected to the other end of the lever 17, such force producing means including a scale pan 19 connected to said other end of the lever 17 by a link 20 in the particular construction illustrated.

Considering the operation of the embodiment 10 of the invention, the receptacle 11 is preferably first filled with water to the level 21 of the zero graduation on the receptacle. Subsequently, the sand sample whose proportions are to be determined is placed in the receptacle 11, thereby raising the water level to the level 22. The difference between the two levels 21 and 22 represents the volume of the sand sample, which may be obtained easily by taking the difference between the graduations 15 at the two levels.

There are several reasons for placing additional water in the receptacle 11 over and above any water initially in the sand sample, such additional water being termed "base water" hereinafter. For example, the base water displaces air in the sand sample to eliminate any voids therein, and also makes the upper level 22 easier to read. The apparatus is preferably so balanced that the base water produces a reading of zero on the scale 12. Thus, as soon as the sand sample is placed in the receptacle 11, its weight and volume become known. The density and specific gravity of water are unity, employing the metric system for purposes of illustration, and the density or specific gravity of the dry sand may readily be determined in any suitable manner, such as with various forms of the embodiments discussed hereinafter. Thus, with the exception of X, the weight of the dry sand, all of the variables in Equation 2 are known as soon as the sand sample is placed in the receptacle 11.

The invention solves for X in Equation 2 through the lever means comprising the lever 17 and the force producing means comprising the scale pan 19 and suitable balance weights, not shown. Referring to Equation 2, it will be apparent that the term W therein, which is the weight of the sand sample, is applied directly to the scale 12. Consequently, if a sufficient number of balance weights, not shown, are placed on the scale pan 19 to reduce the reading of the scale 12 to KV, then the total weight placed on the scale pan must be equal to Expression 3.

Thus, the weight of dry sand, X, may be determined readily by solving for X in Expression 3.

Considering a numerical example purely as a matter of illustration and with no intention of limiting the invention thereto, let us assume that the sand sample weighs 110 grams and that its volume is 50 cubic centimeters. Consequently, with the 1:1 ratio shown for the lever 17, it is necessary to place 60 grams on the scale pan 19 to reduce the reading of the scale 12 to 50. Consequently 60 grams is equal to Expression 3. If we assume that the density of the sand is 2.5 grams per cubic centimeter so that the specific gravity of the sand is 2.5, then 60 grams is $\frac{3}{5}$ of the weight of the dry sand. Consequently, dividing 60 by $\frac{3}{5}$ results in the value of 100, which is the weight of the dry sand. The weight of the water in the sand sample then is 10 grams.

Figure 2:
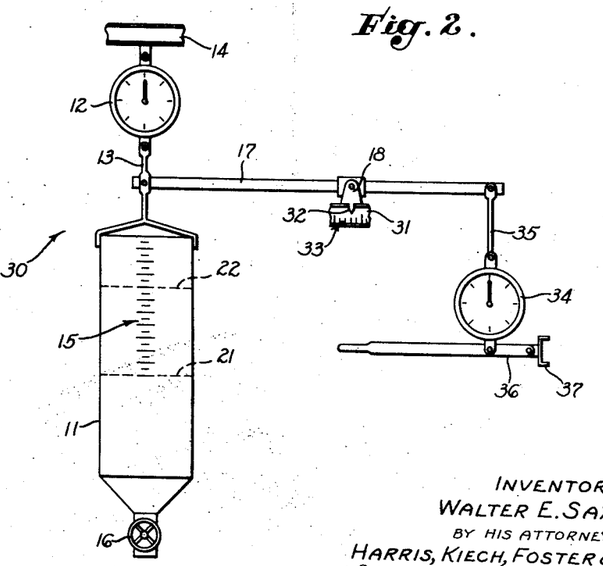
Fig. 2 is a diagrammatic view of a second embodiment of the invention.

The foregoing computations necessary to solve for X in Expression 3 are completely eliminated in the embodiment illustrated in Fig. 2 of the drawings, such embodiment being indicated generally by the numeral 30. Identical reference numerals are employed for like components of the embodiments 10 and 30. The principal differences between the embodiments 10 and 30 are that in the embodiment 30, the fulcrum 18 is movable relative to a support 31, the fulcrum being provided with a pointer 32 which is movable over a scale 33 for indicating the position of the fulcrum relative to the lever 17. This scale is calibrated in terms of the density of the dry sand for a reason which will become apparent. Instead of the scale pan 19, a weight scale 34 for measuring the input force to the lever means is employed, this weight scale being connected to the lever 17 by a link 35. A lever 36 pivotally connected to a support 37 and to the scale 34 is employed to apply the input force to the lever means.

Continuing with the illustrative numerical example considered previously in connection with the embodiment 10, it will be assumed again that the density of the dry sand is 2.5. If the fulcrum 18 is so positioned that the pointer 32 thereon is opposite the 2.5 indicium on the scale 33, then the scale 34 for measuring the input force indirectly indicates the value of X, or the dry sand weight. Thus, the embodiment 30 automatically solves for X without any necessity for computations, which is an important feature. It will be noted that with a dry sand density of 2.5, the distance between the link 13 and the fulcrum 18 must be $\frac{5}{8}$ of the length of the lever 17 and the distance between the fulcrum 18 and the link 35 must be $\frac{3}{8}$ of the length thereof to cause the scale 34 to read the value of X correctly. As previously mentioned, these numerical values are intended as illustrative only and not as limiting.

An important feature of the embodiment 30 is that it may be employed to determine directly the density of any material. For example, let us assume that dry sand is placed in the receptacle 11 of the embodiment 30. Thus, since the weight of the water in the sample is equal to zero when the sample is dry sand, Expression 2 becomes $$KV = \frac{W}{S} \qquad (4)$$

As will be apparent, by pulling downwardly on the lever 36 until the scale 34 reads W and by adjusting the movable fulcrum 18 to maintain the reading of the scale 12 at KV, the indicium on the scale 33 opposite the pointer 32 is the density or specific gravity of the dry sand, which is an important feature of the invention. Thus, the embodiment 30 may be employed not only to measure the proportions of sand and water in any sand sample placed in the receptacle 11, but may be employed to make the initial determination of the density of the dry sand. Dry sand may, of course, be readily obtained by drying another sample of sand from the same source.

Figure 3:
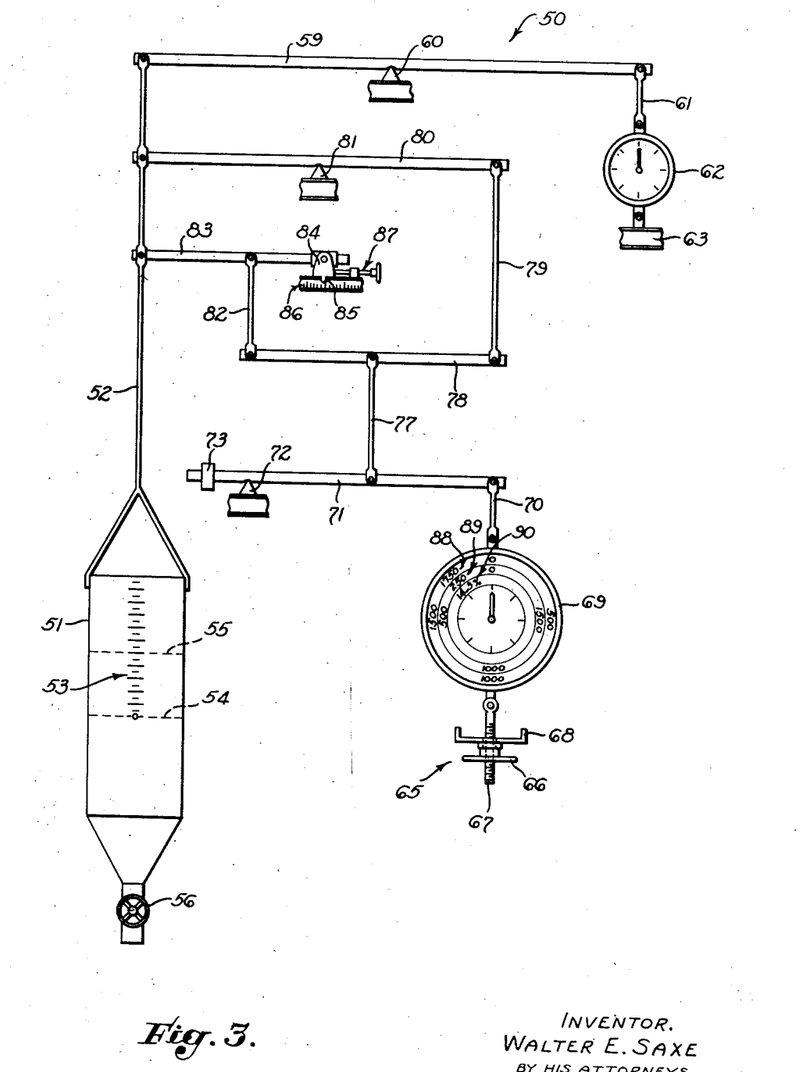
Fig. 3 is a diagrammatic view of a third embodiment of the invention.

Referring now to Fig. 3 of the drawings, the embodiment illustrated therein is designated generally by the numeral 50 and includes a receptacle 51 which is supported by a link 52, the receptacle being provided with volume graduations 53 which form a volume responsive measuring means for measuring the volume of a sand sample placed in the receptacle. As in the previous embodiments, the receptacle 51 is preferably filled with water to a base level 54, the level of the base water plus the sand sample being at 55. As in the case of the receptacle 11, the receptacle 51 is provided with a dump valve 56.

The link 52 supporting the receptacle 51 is pivotally connected at its upper end to one end of a lever 59 which forms part of a lever means of the embodiment 50. The lever 59 is supported at its midpoint by a fulcrum 60, and pivotally connected to the opposite end of the lever 59 through a link 61 is a weight responsive means illustrated as a weight scale 62. The scale 62 is connected to a support 63.

The embodiment 50 also includes a force producing means 65 which is illustrated as including a handwheel 66 threaded onto a bolt 67 which extends through a fixed support 68. Pivotally connected to the upper end of the bolt 67 is a weight scale 69 which, as will become apparent, serves to measure the input force produced by the force producing means 65. The scale 69 is connected by a link 70 to one end of a lever 71 which is supported at its opposite end by a fixed fulcrum 72, the effective length of the lever being regarded as the distance between the fulcrum 72 and the point of connection of the link 70. An extension of the lever 71 beyond the fulcrum 72 carries a tare weight 73 which may be adjusted to balance out the base water in the receptacle 51 in a manner that will be apparent.

Pivotally connected to the lever 71 at its midpoint is a link 77, the other end of this link being pivotally connected to the midpoint of a lever 78. One end of the lever 78 is pivotally connected to a link 79, the other end of this link being pivotally connected to one end of a lever 80 which is supported at its midpoint by a fulcrum 81. The other end of the lever 80 is pivotally connected to the link 52 supporting the receptacle 51.

The other end of the lever 78 is pivotally connected to a link 82 which, in turn, is pivotally connected to a lever 83 intermediate the ends of this lever. One end of the lever 83 is connected to the link 52 supporting the receptacle 51, and the other end of the lever 83 is supported by a fulcrum 84 which is movable relative to the lever 83. The fulcrum 84 carries a pointer 85 which is movable over a scale 86 calibrated in terms of dry sand density. An adjusting screw 87 is shown for adjusting the position of the fulcrum 84.

Considering the operation of the embodiment 50, the tare weight 73 is initially positioned to balance the system with base water in the receptacle 51 to the base level 54. A sand sample of predetermined weight, e. g., 2000 grams, is then placed in the receptacle 51, whereupon the volume graduations 53 indicate the volume of the sand sample and the scale 62 indicates the weight thereof. The fulcrum 84 is, of course, so positioned that the pointer 85 thereon is opposite the proper dry sand density indicium on the scale 86. For example, if the density of the dry sand is 2.5, the fulcrum 84 is so positioned that the distance between it and the link 82 is $2/5$ of the effective length of the lever 83.

The next step is to rotate the handwheel 66 until the scale 62 indicates the volume of the sand sample as measured by the graduations 53, the scale 69 simultaneously measuring the input force applied to the lever system shown. As soon as a sufficient input force has been applied to the lever system to reduce the reading of the scale 62 to K times the volume of the sand sample (K times the volume being numerically equal to the volume in the metric system since K is one), the input force is equal to X in Equation 2, whereby the embodiment 50 directly solves this equation for X. Considering how this is accomplished, it will be seen that when the handwheel 66 has been adjusted to apply an input force equal to X to the lever system, the tension in the link 70 is equal to X. Consequently, the tension in the link 77 is equal to 2X. This 2X force is split up into X forces applied to the links 79 and 82, respectively. The X force applied to the link 79 acts through the lever 80 to apply an upward force equal to X to the link 52 supporting the receptacle 51. Thus, referring to Equation 2, it will be seen that the lever 80 subtracts X from W. The X force applied to the link 82 acts on the lever 83 to apply a downward force of $X/S$ to the link 52 supporting the receptacle 51, thereby adding the $X/S$ term to the difference between W and X in Equation 2. Thus, it will be seen that as soon as the handwheel 66 has been rotated sufficiently to reduce the reading of the scale 62 to KV, the input force applied by the force producing means 65 is equal to X, which is an important feature of the invention.

Preferably, the scale 69 for measuring the input force is provided with a dial having three concentric scales, 88, 89 and 90 thereon. The outer scale 88 designates the weight of dry sand, the intermediate scale designates the weight of water, and the inner scale designates the percentage of water by weight in the sand sample. As will be apparent, if the system is designed to handle a specific sand sample weight, such as 2,000 grams, the outer scale 88 on the dial of the scale 69 may range from 0 to 2,000 grams in the clockwise direction, the intermediate scale may range from 0 to 2,000 grams in the counterclockwise direction, and the inner scale may range from 0 to 100% in the counterclockwise direction. Thus, if a sample weighing 2000 grams and containing 1,750 grams of dry sand is placed in the receptacle 51, the pointer of the scale 69 indicates 1,750 grams of dry sand, 250 grams of water, and 14.3% of water by weight, assuming that 2,000 grams of sample was placed in the receptacle 51 originally. It will be noted that the percentage scale shown is the percentage of water relative to the percentage of dry sand, and not relative to the weight, W, of the sand sample.

It will be noted that the embodiment 50 will indicate directly whether the sample is all sand, or all water. If the sample is all water, the scale 62 will immediately indicate the volume of the sample so that no input force is necessary, and the pointer of the scale 69 will remain at 2,000 on the intermediate scale 89 to indicate that all of the sample is water. On the other hand, if the sample is dry sand, then it will be necessary to apply a sufficient input force to rotate the pointer of the scale 69 to one full revolution in order to reduce the reading of the scale 62 to the volume of the sample.

Figure 4:
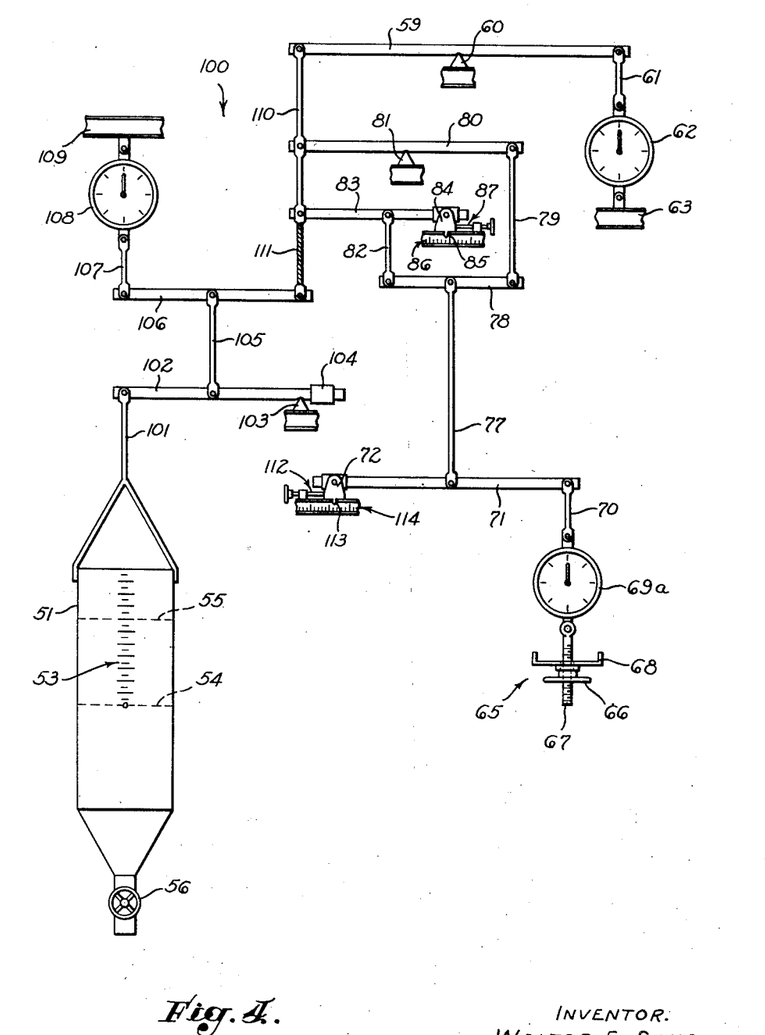
Fig. 4 is a diagrammatic view of a fourth embodiment of the invention.

Turning now to Fig. 4 of the drawings, the embodiment illustrated therein is designated generally by the numeral 100 and is similar to the embodiment 50 described previously, identical numerals being employed for corresponding elements. Considering the differences between the embodiments 100 and 50, the former is illustrated as including a weight scale 69a for measuring the input force which is similar to the corresponding scale 69 of the embodiment 50, but which is shown as provided with dial having but a single scale. However, a multiple scale dial may be employed if desired. In the embodiment 100, the receptacle 51 is supported by a link 101 which is pivotally connected at its upper end to one end of a lever 102 supported at its other end by a fulcrum 103, the effective length of the lever 102 being regarded as the distance between the link 101 and the fulcrum 103. A tare weight 104 carried by an extension of the lever 102 serves to balance the system, this tare weight being substituted for the tare weight 73 of the embodiment 50. Connected to the lever 102 midway between the link 101 and the fulcrum 103 is a link 105 which is pivotally connected at its upper end to the midpoint of a lever 106. One end of this lever is connected by a link 107 to a weight responsive means illustrated as a weight scale 108, the latter being connected to a support 109. The other end of the lever 106 is pivotally connected to a link 110. The levers 59, 80 and 83 are pivotally connected to the link 110, instead of to a link supporting the receptacle 51 as in the embodiment 50. If necessary to prevent feedback to the scale 108, the section 111 of the link 110 between the levers 83 and 106 may be made flexible. The fulcrum 72 for the lever 71 is adjustable, as by means of an adjusting screw 112, and this fulcrum carries a pointer 113 which is movable over a scale 114. The scale 114 for the movable fulcrum 72 is calibrated in terms of a percentage by weight of the moisture within the sand sample, preferably with reference to the dry weight of the sand.

Considering the operation of the embodiment 100 illustrated in Fig. 4 of the drawings, the adjustable fulcrum 72 is initially positioned so that the distance between it and the link 77 is equal to the distance between the links 77 and 70, i. e., so that the pointer 113 is opposite the zero indicium on the moisture percentage scale 114. After a sand sample of any weight within the capacity of the apparatus has been placed in the receptacle 51 with the system initially balanced by means of the tare weight 104, the force producing means 65 is operated to reduce the reading of the scale 62 to K times the volume of the sand sample (K times the volume being numerically equal to the volume in the metric system), the scale 108 continuing to read the weight of the sand sample. When this has been accomplished, the scale 69a indicates the weight of dry sand in the sample as in the embodiment 50. If the sand sample was initially completely dry, the scales 69a and 108 read alike at this point so that no adjustment of the movable fulcrum 72 is necessary.

However, if the indications provided by the scales 69a and 108 differ, then the operator adjusts the position of the movable fulcrum 72 until the scale 69a reads the same as the scale 108. The pointer 113 is then opposite the indicium on the scale 114 corresponding to the percentage of moisture content of the sand sample.

Considering the manner in which the percentage moisture scale 114 may be calibrated, assume a sand sample known to contain 75 grams of dry sand and 25 grams of water, which means that the percentage moisture content relative to the dry weight of sand is 33⅓. With the movable fulcrum 72 so positioned that the distance between the fulcrum 72 and the link 77 is equal to the distance between the links 77 and 70, the force producing means is adjusted until the scale 69a reads 75 grams. At this point, the scale 62 reads the volume of the sample and the scale 108 reads the weight of the sample. Also, under such conditions, the tension in the link 77 is equal to 150 grams. The operator then moves the adjustable fulcrum 72 until the scale 69a reads the same as the scale 108, or 100 grams. Thus, since the link 77 applies a force of 150 grams to the lever 71 and the link 70 applies a force of 100 grams thereto, the distance between the fulcrum 72 and the link 77 is now twice the distance between the links 77 and 70. Consequently, the pointer 113 on the fulcrum 72 is now opposite the 33⅓% indicium on the scale 114. As previously indicated, when the sand is dry, the distance between the fulcrum 72 and the link 77 is equal to the distance between the links 77 and 70 and the pointer 113 is opposite the zero indicium on the scale 114. The balance of the scale 114 may be calibrated in a similar manner.

Figure 5:
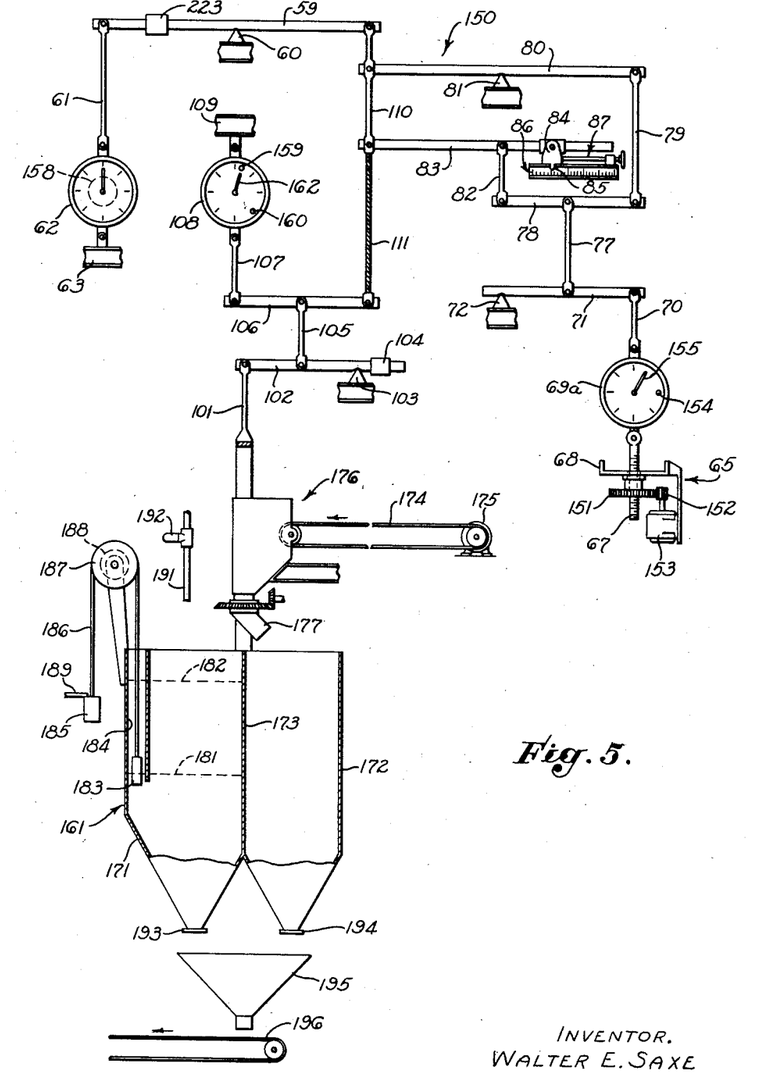
Fig. 5 is a diagrammatic view of a fifth embodiment of the invention.

Referring now to Fig. 5 of the drawings, the embodiment illustrated therein, indicated generally by the numeral 150, comprises an apparatus for weighing out a predetermined batch of sand and for adding to the batch the weight of water necessary to provide the total amount of water required for a particular concrete mix. Of course, in addition, the embodiment 150 determines the amount of water present in the sand initially, the additional water added being sufficient to bring the total water content up to the desired value. Basically, the embodiment 150 is similar to the embodiment 100, identical reference numerals being employed for corresponding components. Considering the differences between the embodiment 150 and the embodiment 100, the fulcrum 72 is shown as fixed, although it may also be adjustable and provided with a pointer and a moisture percentage scale as in the embodiment 100 if desired. The handwheel 66 of the force producing means 65 is replaced by a gear 151 threaded on the bolt 67, the gear 151 being meshed with a gear 152 on the shaft of a reversible electric motor 153. Also, the scale 69a is provided with a light source 154 which is adapted to be positioned opposite an indicium on the dial of the scale 69a corresponding to a desired value of dry sand weight. The scale 69a is provided with a pointer 155 formed of a material which is capable of conveying light along irregular paths, the pointer 155 being adapted to convey light from the light source 154 to a photocell 156, Fig. 6, when it registers with the light source.

Continuing to consider the differences between embodiments 150 and 100, the embodiment 150 includes a master synchro 158 which is driven by the scale 62, as by having its rotor, not shown, connected to the indicator shaft of the scale 62. The scale 108 is provided with light sources 159 and 160 which are preferably adjustable relative to the dial of this scale. The first light source 159 on the dial of the scale 108 is adapted to be positioned opposite an indicium thereon corresponding to the amount of base water in a receptacle 161 which is supported by the link 101 and which will be described hereinafter, the receptacle 161 corresponding to the receptacle 51 of the embodiment 100. The scale 108 is also provided with a pointer or indicator 162 for conveying light from the light sources 159 and 160 in succession to a photocell 163, Fig. 6. The light source 160 is adapted to be positioned opposite an indicium on the dial of the scale 108 corresponding to the total weight of dry sand and water desired for a particular batch.

Considering the receptacle 161 in more detail, it includes two compartments 171 and 172 separated by a partition 173. Dry or wet sand from a suitable source is carried toward the receptacle 161 by a conveyor 174 driven by a motor 175. The conveyor discharges into a splitting means 176 which is positioned above the receptacle 161 and which includes a rotary spout 177 for discharging part of the sand delivered by the conveyor 174 into the compartment 171 and the balance into the compartment 172. The splitting means 176 per se forms no part of the present invention and, for a detailed description of a suitable splitting means, reference is hereby made to my copending application Serial No. 209,500, filed February 5, 1951, now Patent No. 2,587,531. The splitting means 176 may split the stream of sand on the conveyor 174 in any desired proportions, such as one half to the compartment 171 and one half to the compartment 172, or one third to the compartment 171 and two thirds to the compartment 172, or the like.

The compartment 171 may be filled initially with base water to a base level indicated by the broken line 181, the broken line 182 indicating the level after a predetermined amount of sand has been discharged into the receptacle 161. A float 183 is disposed in a float chamber 184 which communicates with the body of the compartment 171, the float 183 being responsive to the level, or volume, in the compartment 171 and being connected to a weight 185 by a cord 186 trained over a pulley 187 which drives a synchro 188 to provide a volume responsive measuring means. Thus, the position of the rotor of the synchro 188 corresponds to the level in the compartment 171. Downward movement of the float 183 below the base level is prevented by a stop 189 engageable with the weight 185.

Additional water may be introduced into the compartment 171 through a delivery pipe 191 controlled by a solenoid valve 192.

The compartments 171 and 172 of the receptacle 161 are provided with gates 193 and 194 which may be opened to discharge the contents of these compartments into a hopper 195 as soon as the batch has been brought to the desired proportions of sand and water, the hopper 195 discharging onto conveyor 196 leading to a suitable point of use for the batch.

It should be noted that the link 101 supports only the receptacle 161, on which the pulley 187 is preferably mounted, the other elements associated with the receptacle, i. e., the conveyor 174, the splitting means 176, the delivery pipe 191, the hopper 195 and the conveyor 196, being independently supported in any suitable manner, not shown. Thus, the embodiment 150 responds only to the weight of sand and water in the receptacle 161.

Figure 6:
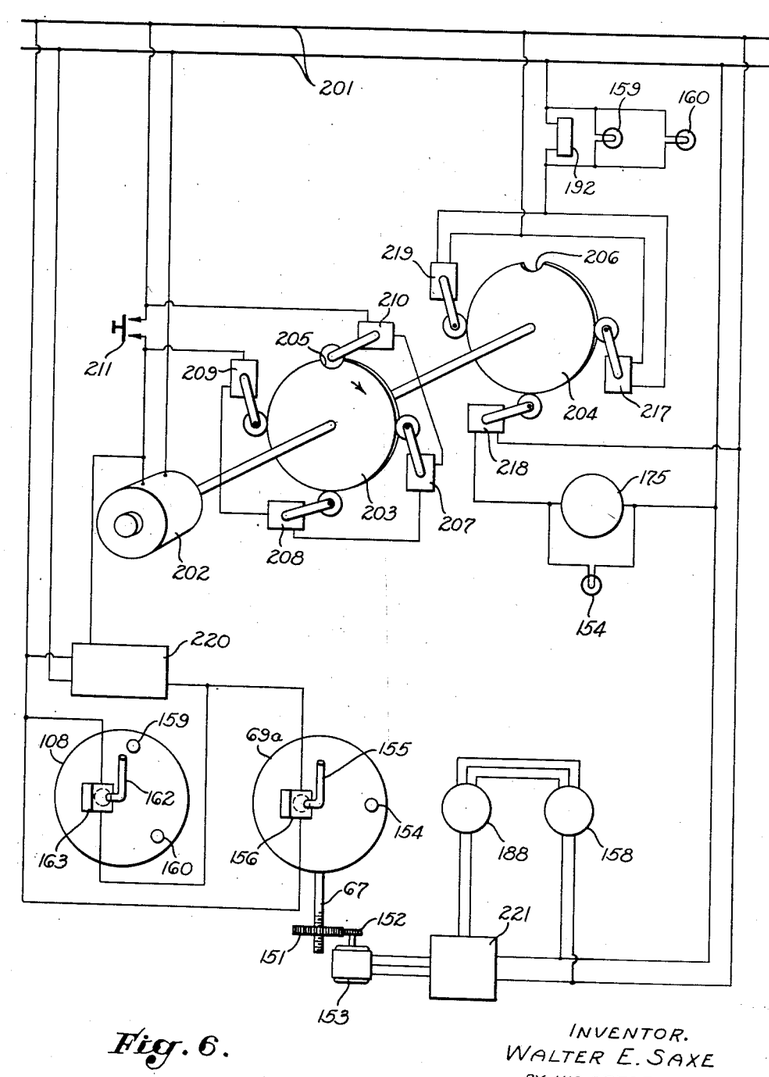
Fig. 6 is a diagrammatic view of a control system for the embodiment of Fig. 5.

The description of the embodiment 150 of the invention has thus far been limited to a description of the structure thereof, and the relation between the various elements hereinbefore described will now be considered in connection with the wiring diagram of the control system therefor which constitutes Fig. 6 of the drawings. Referring to Fig. 6, the circuit illustrated therein includes main power leads 201 across which is connected a timing motor 202, the latter driving discs 203 and 204 respectively provided with notches 205 and 206 therein. The timing motor 202 is connected in series with a series of switches 207, 208, 209 and 210 which are spaced apart around the periphery of the disc 203. These switches are provided with rollers which are adapted to drop into the notch 205 in the disc 203, and are normally closed, each switch opening when its roller drops into the notch 205. Thus, the timing motor 202 is energized as long as none of the switches 207 to 210 engage the notch 205. A start switch 211 is connected in parallel with the series-connected switches 207 to 210. The disc 204 has switches 217, 218 and 219 spaced therearound in axial alignment with the switches 207, 208, 209, respectively. The switches 217 to 219 are normally open and close when rollers carried thereby drop into the notch 206 in the disc 204. The switches 217 and 219 are connected in parallel with each other and in series with the solenoid valve 192 so that the solenoid valve opens the delivery pipe 191 whenever either the switch 217 or the switch 219 engages the notch 206. It will be noted that the light sources 159 and 160 are connected in parallel with the solenoid valve 192 so that they are energized at the same time the solenoid valve is energized. The switch 218 is connected in series with the conveyor motor 175 which, in turn, is connected across the main power leads 201. Thus, whenever the roller on the switch 218 drops into the notch 206, the conveyor motor 175 is energized to deliver sand to the receptacle 161. The light source 154 on the scale 69a is connected in parallel with the motor 175 so that it is also energized when the motor is energized. The photocells 156 and 163 are connected across the main power leads 201 through a photorelay 220 which is also connected to the timing motor 202 to control its operation in a manner to be described. Since photorelays are well known in the art, it is thought unnecessary to describe the photorelay 220 in detail. Essentially, the photorelay 220 comprises a switch connected in series with the timing motor 202 and in parallel with the start switch 211 and the series-connected switches 207 to 210, the switch in the photorelay being actuated to energize the timing motor 202 whenever light from one of the sources 154, 159 or 160 reaches one of the photocells 156 or 163 through the pointers 155 or 162. The two synchros 158 and 188, which are respectively responsive to the position of the indicator on the scale 62 and the position of the float 183, are interconnected as shown and are connected to a relay 221 which is not shown in detail. Essentially, the relay 221 includes a reversing switch for the reversible motor 153 for applying the input force to the lever system of the apparatus. For a detailed description of a relay suitable for the relay 221, reference is made to my copending application Serial No. 137,081, filed January 6, 1950, now abandoned.

For convenience in considering the operation of the embodiment 150 of the invention illustrated in Figs. 5 and 6 of the drawings, an example citing specific numerical values will be discussed, it being understood that the invention is not to be limited thereto. Let us assume that it is desired to weigh out a batch of sand and water having a total weight of 2,000 kilograms and having the proportions of 1,700 kilograms of sand and 300 kilograms of water. Also assume that the sand, if dry, has a density of 2.5 kilograms per liter. Consequently, it is necessary to set the light source 154 on the scale 69a, which indicates the weight of dry sand, opposite the 1,700 kilogram indicium on this scale. Similarly, the light source 160 on the scale 108, which responds to the total weight of sand and water, is set opposite the 2,000 kilogram indicium on the dial of this scale. Assuming that 100 kilograms of water are required initially to bring the level up to the base level 181 in the compartment 171, the light source 159 is positioned opposite the 100 kilogram indicium on the total scale 108. A tare weight 223 on the lever 59 is so positioned to cancel the effect of this 100 kilograms of base water on the scale 62 since, as hereinbefore discussed in detail in connection with previous embodiments, it is necessary that only the sand delivered to the receptacle be permitted to affect the scale 62 in order to permit obtaining the actual dry sand weight on the scale 69a. Thus, the synchro 158 does not respond until sand is delivered to the receptacle 161 by the conveyor 174 and the splitting means 176. Similarly, the synchro 188 does not respond until the level rises above the base level 181, the float system being mechanically stopped by the stop 189 to prevent movement of the float 183 below the base level 181. To complete the initial setup, the adjustable fulcrum 84 is so positioned that the indicator 85 thereon is opposite the 2.5 indicium on the density scale 86.

After the foregoing adjustments have been made, the embodiment 150 is ready for operation and, initially, the timing motor and the discs 203 and 204 driven thereby are in the positions shown in Fig. 6. To set the apparatus in motion, the operator merely closes the start switch 211 momentarily. This action energizes the timing motor 202, whereupon the disc 203 is rotated to disengage the switch 210 from the notch 205, thereby closing the switch 210 to complete a parallel current path across the start switch 211. Thus, it will be seen that it is necessary to close the start switch 211 only long enough to permit the notch 205 to disengage the switch 210.

The timing motor 202 rotates the discs 203 and 204 until such time as the notch 205 in the disc 203 engages the roller of the switch 207 to open this switch, thereby stopping the timing motor. At the same time, the roller on the switch 217 engages the notch 206 to close this switch, thereby energizing the solenoid valve 192 and the light sources 159 and 160. Energization of the solenoid valve 192 permits water to enter the compartment 171 of the receptacle 161 through the delivery pipe 191. As soon as 100 kilograms of water, sufficient to bring the level up to the base level 181, have been delivered to the compartment 171, the pointer 162 on the scale 108 registers with the light source 159. The pointer 162 conveys the light to the photocell 163, which actuates the photorelay 220 to start the timing motor 202 again. As soon as the timing motor starts, the notch 206 in the disc 204 disengages the switch 217 to de-energize the solenoid valve 192, thereby cutting off the flow of water into the compartment 171 as soon as 100 kilograms of water have been delivered thereto. At the same time, the light source 159 is de-energized so as to de-energize the photocell 163 and the photorelay 220, but, by this time, the switch 207 has disengaged the notch 205 in the disc 203 so that the timing motor 202 continues to operate, current being supplied thereto through the series-connected switches 207 to 210.

Thus, up to this point in the operating cycle of the embodiment 150, the desired base water has been introduced into the compartment 171. Now, the timing motor 202 continues to rotate the discs 203 and 204 until the switches 208 and 218 respectively engage the notches 205 and 206 in the discs 203 and 204, thereby opening the switch 208 to de-energize the motor 202 and thereby closing the switch 218 to energize the conveyor motor 175 and the light source 154. Thus, the conveyor 174 delivers sand to the splitting means 176, which discharges part of the sand into the compartment 171 and the balance into the compartment 172. The conveyor motor 175 continues to operate to deliver sand to the receptacle 161 and, at the same time, the synchros 158 and 188 respectively respond to the increasing weight applied to the scale 62 and the increasing volume applied to the float 183 to cause the motor 153, through the controlling relay 221, to operate the force producing means 65. The latter maintains the reading on the scale 69a equal to X in Equation 2, or equal to the dry weight of the sand being discharged into the receptacle 161. As will be apparent, since the reading of the scale 62 must be maintained equal to K times the volume of sand above the base level 181, K times this volume being numerically equal to the volume in the metric system, the interconnection between the synchros 158 and 188 causes the synchros to start and stop the motor 153 as required to keep the scale 62 and the float system in balance. Thus, the reading of the scale 69a is always the weight of the dry sand as sand is discharged into the receptacle 161.

The foregoing action of the system continues until the pointer 155 of the scale 69a registers with the light source 154, which means that the desired 1,700 kilograms of dry sand have been discharged into the receptacle 161. As soon as the pointer 155 registers with the light source 154, it conveys light to the photocell 156 to energize the photorelay 220, which, in turn, energizes the timing motor 202 to start the discs 203 and 204 in motion again. As soon as the notch 206 in the disc 204 disengages the switch 218, the conveyor motor 175 is deenergized to stop the delivery of sand and to de-energize the light source 154. However, by this time, the disc 203 has rotated sufficiently to disengage the notch 205 from the switch 208 so that the timing motor 202 continues to operate even though the circuit thereto through the phototrelay 220 has been broken.

Thus, up to this point in the operating cycle of the embodiment 150, the desired quantity of base water and the desired quantity of dry sand have been delivered to the receptacle 161. Of course, in the event that the sand delivered to the receptacle contained water, the total weight of water and sand in the receptacle 161 is now in excess of the combined weights of dry sand and base water. The next step in the operating cycle is to introduce the additional amount of water required to bring the total weight up to the desired value, 2,000 kilograms in the specific example under consideration. Considering how this is accomplished, the timing motor 202 continues to rotate the discs 203 and 204 until the respective notches 205 and 206 therein engage the respective switches 209 and 219, thereby opening the switch 209 to stop the timing motor 202 and closing the switch 219 to energize the solenoid valve 192 and the light sources 159 and 160. Energizing the solenoid valve 192 permits the delivery pipe 191 to discharge additional water into the compartment 171, such discharge of additional water being terminated as soon as the pointer 162 on the total weight scale 108 registers with the light source 160, which is positioned opposite the 2,000 kilogram indicium in the particular specific example being considered. When the pointer 162 registers with the light source 160, the timing motor 202 is energized through the photocell 163 and the photorelay 220 in the manner hereinbefore discussed. In other words, the timing motor 202 starts again and rotates the discs 203 and 204 to disengage the notches 205 and 206 therein from the respective switches 209 and 219, thereby establishing an alternative current path to the motor 202 through the series-connected switches 207 to 210. As soon as the notch 206 disengages the switch 219, the delivery of water is terminated by de-energization of the solenoid valve 192. The timing motor continues to rotate the discs 203 and 204 until the notch 205 in the disc 203 engages the switch 210 to stop the timing motor, this representing the end of the operating cycle.

With the operating cycle completed, the batch in the receptacle 161 contains 1,700 kilograms of sand and 300 kilograms of water, as initially desired. By opening the gates 193 and 194, the desired batch may be dumped into the hopper 195 and thence onto the conveyor 196 for use. Thereafter, another operating cycle may be initiated. As will be apparent, when the receptacle 161 is being dumped, the scales 62, 69a and 108 and the float system return to their initial positions, the synchro system 158, 188 causing the scale 69a to return to zero through the reversible motor 153 as the scale 62 and the float system return to zero.

In the event that sand is encountered which is so wet as to run the weight of water above the desired value, the splitting means 176 may be so adjusted as to decrease the proportion of sand delivered to the compartment 171.

It will be understood that although I have employed various specific numerical values in disclosing the invention and have cited an exemplary application of the invention to determining the proportions of water and sand, I do not intend to be limited thereto since other numerical values and other applications are possible. Also, it will be understood that various changes, modifications, and substitutions may be incorporated in the specific embodiments disclosed without necessarily departing from the spirit of the invention.

I claim as my invention:

1. In an apparatus for determining the proportions of two materials of different and known densities in a substance containing at least one of the materials, the combination of: a receptacle for the substance; weight responsive means connected to said receptacle and responsive to the weight of the substance; volume measuring means operatively associated with said receptacle and responsive to the volume of the substance; and means for solving for X in the equation $$V = \frac{X}{D_1} + \frac{W-X}{D_2}$$

wherein V equals the volume of the substance measured by said volume measuring means, W equals the weight of the substance, X equals the unknown weight of one of the materials in the substance, $D_1$ equals the known density of the material whose weight is equal to X, and $D_2$ equals the known density of the other material, the equation solving means including actuating means connected to said receptacle and to said weight responsive means for applying thereto an actuating force which opposes the force applied to said weight responsive means by the weight of the substance and which is at least proportional to X in said equation, and including indicating means connected to said actuating means for automatically measuring and indicating said actuating force.

2. An apparatus as defined in claim 1 wherein said actuating means includes means for applying to said weight responsive means an opposing actuating force equal to $$\frac{X}{KD_1} - \frac{X}{KD_2}$$

where K is a factor for converting density to specific gravity.

3. In combination: a receptacle for a material; weight responsive means connected to said receptacle for measuring the weight of the material; force producing means for producing an input force; lever means connected to said weight responsive means and to said force producing means for applying to said weight responsive means an actuating force which is proportional to said input force, said lever means including a lever, a fulcrum for said lever which is movable relative thereto, and a scale for indicating the position of said fulcrum relative to said lever, said scale being calibrated in terms of the density of the material, whereby said scale indicates the density of the material when said means for measuring said input force indicates the measured weight of the material and said weight responsive means indicates the measured volume of the material; volume measuring means for measuring the volume of the material; and indicating means connected to said force producing means for measuring and indicating said input force.

4. In an apparatus for determining the proportions of two materials in a substance containing at least one of the materials, one of the materials being water and the other having a known density differing from that of water, the combination of: a receptacle for the substance; weight responsive means connected to said receptacle for measuring the weight of the substance; volume measuring means operatively associated with said receptacle for measuring the volume of the substance; and means for solving for X in the equation $$V = \frac{X}{D} + W - X$$

wherein V equals the volume of the substance measured by said volume measuring means, W equals the measured weight of the substance, X equals the unknown weight of said other material, and D equals the known density of said other material, the equation solving means including actuating means connected to said receptacle and to said weight responsive means for applying thereto an actuating force which opposes the force applied to said weight responsive means by the weight of the substance and which is at least proportional to X in said equation, and including indicating means connected to said actuating means for automatically measuring and indicating said actuating force.

5. In an apparatus for determining the proportions of two materials in a substance containing at least one of the materials, one of the materials being water and the other having a known density differing from that of water, the combination of: a receptacle for the substance; weight responsive means connected to said receptacle for measuring the weight of the substance; volume measuring means operatively associated with said receptacle for measuring the volume of the substance; and means for solving for X in the equation $$V = \frac{X}{D} + W - X$$

wherein V equals the volume of the substance measured by said volume measuring means, W equals the measured weight of the substance, X equals the unknown weight of said other material, and D equals the known density of said other material, said equation solving means including force producing means for producing an input force equal to X in said equation, including lever means connected to said weight responsive means and said force producing means for applying to said weight responsive means a net actuating force equal to $$\frac{X}{S} - X$$

when said input force is equal to X, and including means for measuring said input force, S being the specific gravity of said other material.

6. An apparatus as defined in claim 5 wherein said lever means includes a fulcrum for said lever and movable relative thereto, and a scale for indicating the position of said fulcrum relative to said lever, such scale being calibrated in terms of the density of said other material.

7. An apparatus as defined in claim 5 wherein said lever means includes a fulcrum for said lever and movable relative thereto, and a scale for indicating the position of said fulcrum relative to said lever, such scale being calibrated in terms of the percentage by weight of the water in the substance.

8. An apparatus as defined in claim 5 wherein said means for measuring said input force includes a weight scale having a dial calibrated in terms of the weight of said other material in the substance, the weight of the water in the substance, and the percentage by weight of the water in the substance.

9. An apparatus as defined in claim 5 including means responsive to the volume of the substance in said receptacle and operatively connected to said force producing means for automatically actuating said force producing means to maintain said input force equal to X in said equation.

10. An apparatus as set forth in claim 9 including de-energizable means for delivering the substance to said receptacle, and including means, controlled by said means for measuring said input force and operatively connected to said de-energizable means and to said means for measuring said input force, for de-energizing said de-energizable means when said input force attains a predetermined value.

11. An apparatus as defined in claim 10 including another weight responsive means operatively connected to said receptacle, including de-energizable means for delivering water to said receptacle, and including means, controlled by said other weight responsive means and operatively connected to said other weight responsive means and to said de-energizable water-delivering means, for de-energizing said de-energizable water-delivering means when said other weight responsive means indicates a predetermined value of weight.

12. In an apparatus for determining the proportions of two materials of different densities in a substance containing at least one of the materials, the combination of: a receptacle for the substance; weight responsive means connected to said receptacle for measuring the weight of the substance; force producing means for producing an input force; means connected to said weight responsive means and said force producing means for applying to said weight responsive means an actuating force which is a function of said input force, including a lever having a fulcrum which is movable relative to said lever to vary the functional relation between said input force and said actuating force, said apparatus including a scale adjacent said movable fulcrum and calibrated in terms of the density of one of the materials of the substance; and indicating means connected to said force producing means for measuring and indicating said input force.

13. In an apparatus for determining the proportions of two materials of different densities in a substance containing at least one of the materials, the combination of: a receptacle for the substance; weight responsive means connected to said receptacle for measuring the weight of the substance; force producing means for producing an input force; means connected to said weight responsive means and said force producing means for applying to said weight responsive means an actuating force which is a function of said input force, including a lever having a fulcrum which is movable relative to said lever to vary the functional relation between said input force and said actuating force, said apparatus including a scale adjacent said movable fulcrum and calibrated in terms of the percentage by weight of one of the materials in the substance; and indicating means connected to said force producing means for measuring and indicating said input force.

14. In combination: a receptacle; a weight scale connected to said receptacle to indicate the weight of a substance in said receptacle; lever means connected to said scale for applying a force thereto in addition to and opposing the force applied thereto by the weight of a substance in said receptacle, said lever means including a lever having a movable fulcrum and a scale means for indicating the position of said movable fulcrum relative to said lever; means for applying a force to said lever means, said force applying means being connected to said lever means; and indicating means connected to said force applying means for automatically measuring and indicating said additional, opposing force.

15. In combination: a receptacle; a weight scale connected to said receptacle to indicate the weight of a substance in said receptacle; lever means connected to said scale for applying a force thereto in addition to and opposing the force applied thereto by the weight of a substance in said receptacle; means for applying a force to said lever means, said force applying means being connected to said lever means; indicating means connected to said force applying means for automatically measuring and indicating said additional, opposing force; and another weight scale operatively connected to said receptacle to measure the weight of a substance therein, said other weight scale being independent of said lever means.

References Cited in the file of this patent

UNITED STATES PATENTS

| Number | Name | Date |
|---|---|---|
| 591,657 | Moser | Oct. 12, 1897 |
| 830,976 | Vilbiss | Sept. 11, 1906 |
| 1,749,606 | Robb | Mar. 4, 1930 |
| 2,291,771 | Stancliff | Aug. 4, 1942 |
| 2,336,130 | Saxe | Dec. 7, 1943 |
| 2,343,000 | Carliss | Feb. 29, 1944 |
| 2,467,300 | Fate | Apr. 12, 1949 |

FOREIGN PATENTS

| Number | Country | Date |
|---|---|---|
| 290,913 | Great Britain | May 24, 1928 |